United States Patent [19]

Ballin

[11] 4,077,562

[45] * Mar. 7, 1978

[54] TIE STRIP

[75] Inventor: Gene Ballin, Locust Valley, N.Y.

[73] Assignee: Betty Ballin, Locust Valley, N.Y.

[*] Notice: The portion of the term of this patent subsequent to Aug. 10, 1993, has been disclaimed.

[21] Appl. No.: 711,034

[22] Filed: Aug. 2, 1976

Related U.S. Application Data

[63] Continuation-in-part of Ser. No. 624,014, Oct. 20, 1975, Pat. No. 3,973,610, which is a continuation-in-part of Ser. No. 434,548, Jan. 18, 1974, Pat. No. 3,913,178.

[51] Int. Cl.$^2$ ............................................. B65D 33/30
[52] U.S. Cl. .................................... 229/62; 24/16 PB; 24/30.5 P
[58] Field of Search .............. 24/16 PB, 17 PB, 17 A, 24/30.5 P, 206 A; 248/74 P; 150/3; 229/62, 63

[56] References Cited

U.S. PATENT DOCUMENTS

| 3,106,028 | 10/1963 | Baumgartner ................ 24/16 PB X |
| 3,255,501 | 6/1966 | Laguerre ........................... 24/16 PB |
| 3,913,178 | 10/1975 | Ballin ................................ 24/16 PB |
| 3,973,610 | 8/1976 | Ballin ............................ 24/16 PB X |

FOREIGN PATENT DOCUMENTS 903,599   8/1962   United Kingdom ............. 24/30.5 P Primary Examiner—Werner H. Schroeder
Assistant Examiner—Moshe I. Cohen

[57] ABSTRACT

A tie strip is formed of a flexible resilient material in strip form, with regularly longitudinally spaced openings formed in the strip and a pair of oppositely directed pawl acting tongues projecting from opposite end edges of each opening toward each other. The strip, in application, is folded at its end about its medial axis and inserted in a selected opening and it is movable through the opening in only one direction when inclined to the strip at the engaging opening in such direction and is movable in the opposite direction upon reversal of the inclination, the opposite tongues functioning as opposing pawls.

Another embodiment has a series of longitudinally spaced openings formed in the strip with a tongue projecting from one edge of each opening facing an enlarged one end of the strip. The one end of the strip has an opening therein with inwardly directed sides having a pair of tongues projecting from opposite end edges of the opening towards each other. An additional embodiment has the opening in the one end of the strip with one tongue only projecting inwardly from the end edge of the opening facing the edge of the one end of the tie strip.

11 Claims, 12 Drawing Figures

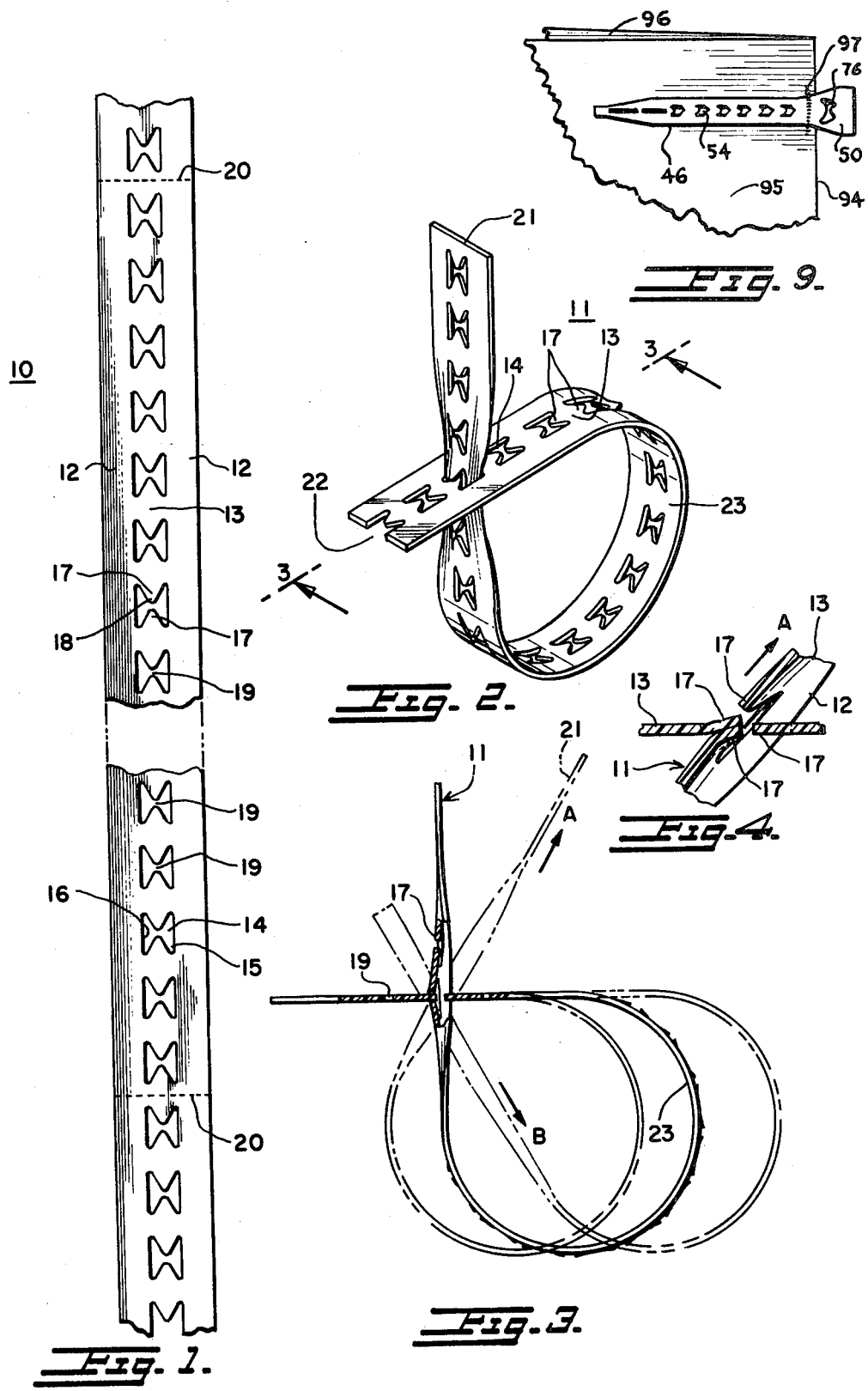

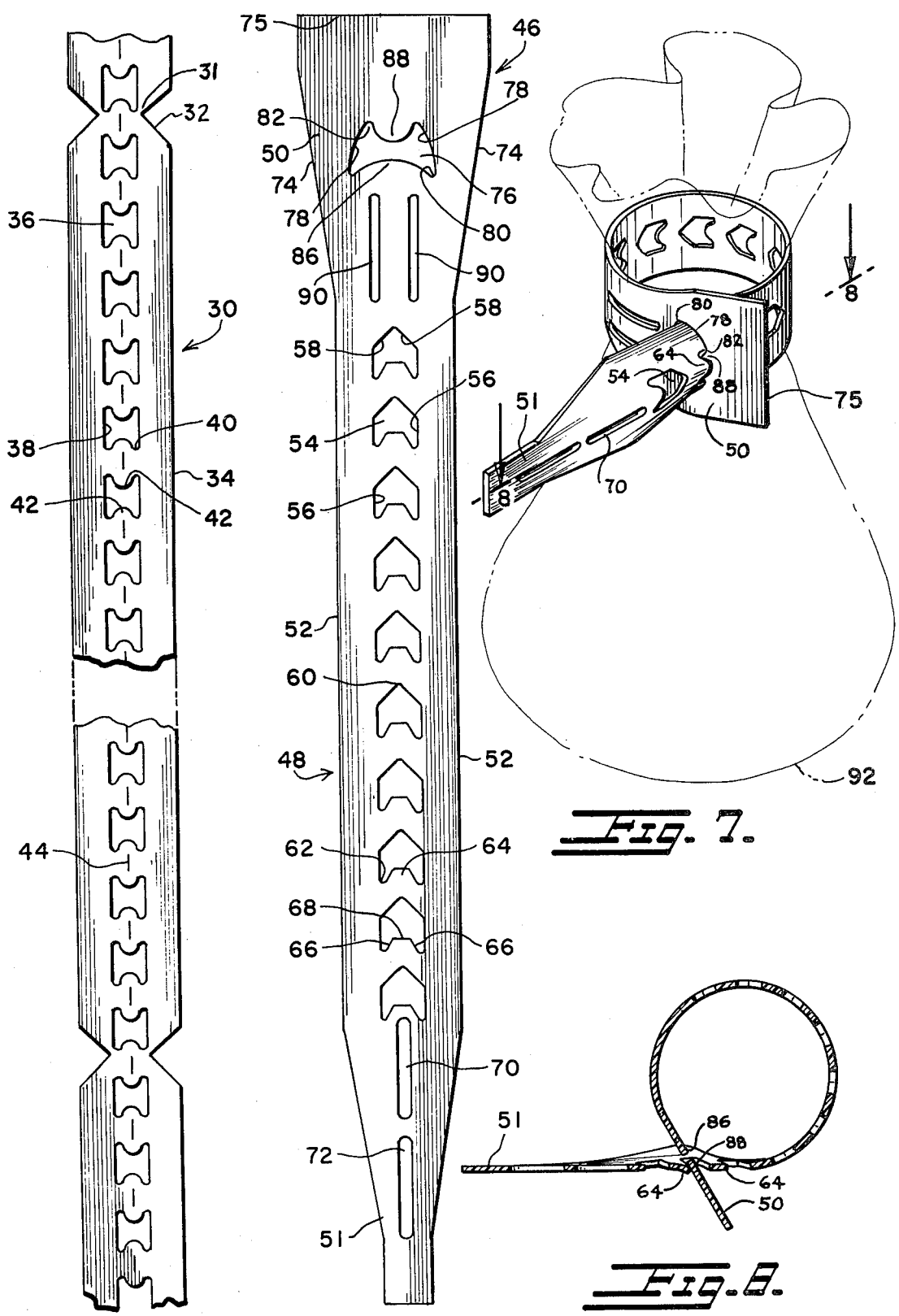

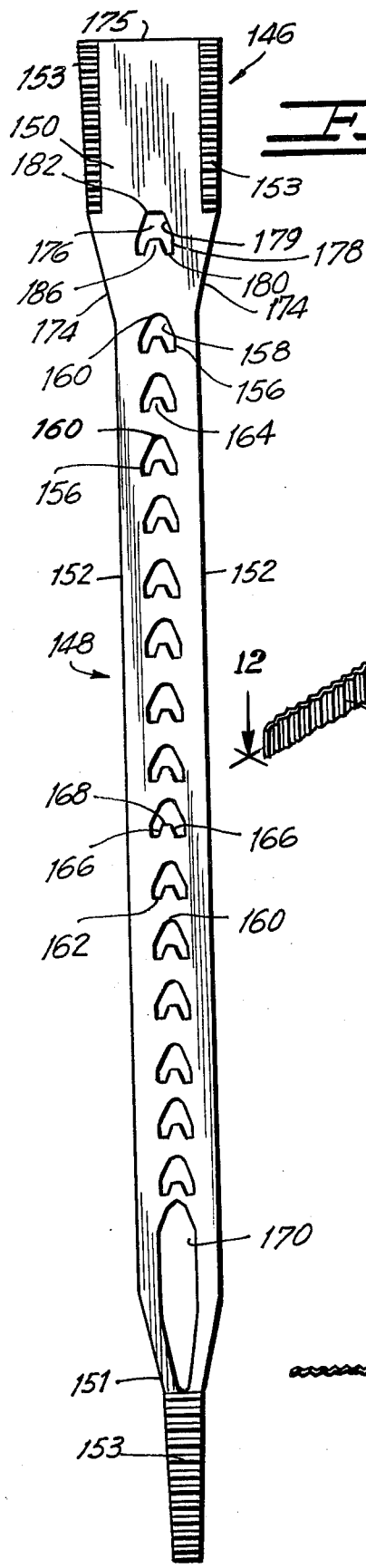
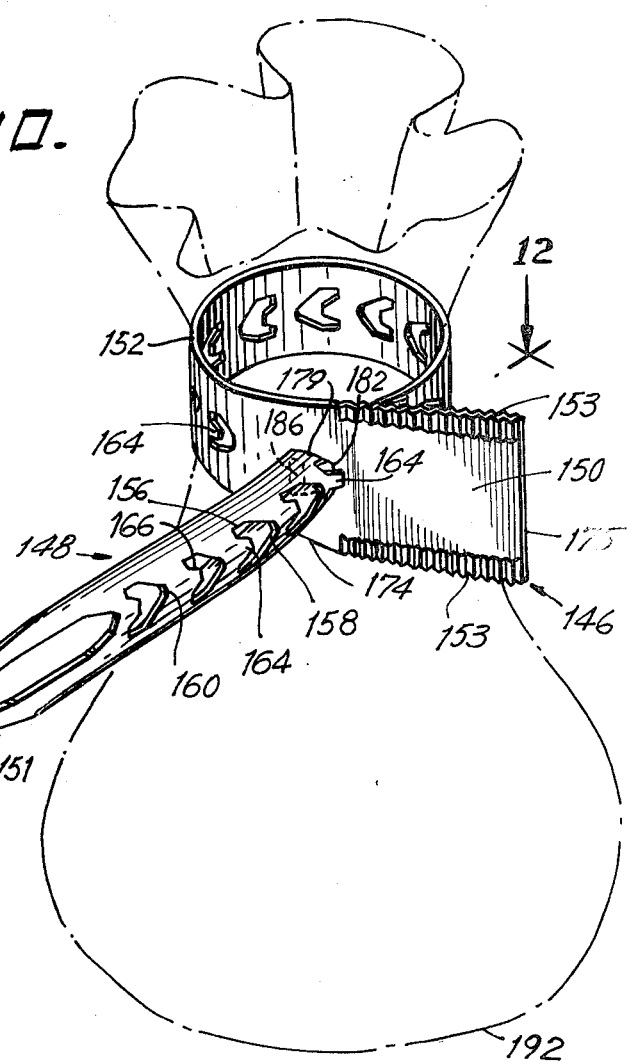
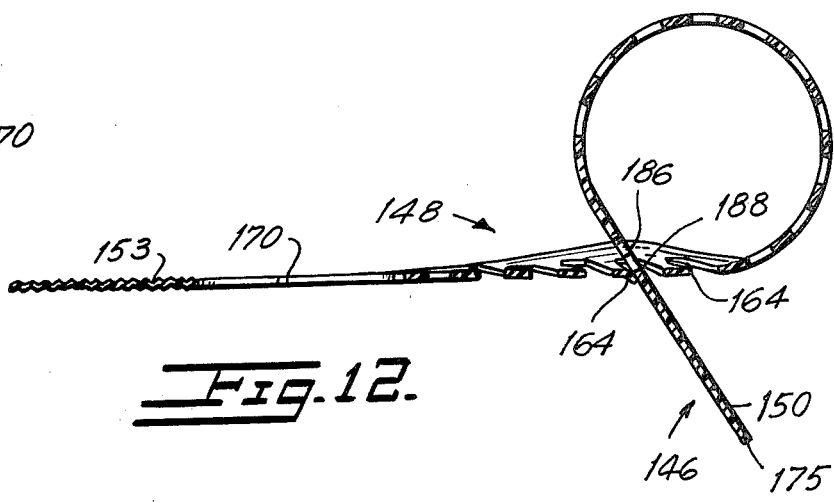

TIE STRIP

This application is a continuation-in-part of my copending application Ser. No. 624,014, filed Oct. 20, 1975, now U.S. Pat. No. 3,973,610 which in turn is a continuation-in-part of application Ser. No. 434,548, filed Jan. 18, 1974, now U.S. Pat. No. 3,913,178.

The present invention relates generally to improvements in fastening devices and it relates generally to an improved tie strip for application to bags or other containers for maintaining the closure thereof, to bunches of articles or to other uses.

It is a common practice in releasably securing bags in a closed condition to gather the border of the bag proximate its open end into a closed neck and applying a tie strip or other fastener or tie to the closed neck. This procedure is followed in a wide variety of applications such as to paper bags, plastic bags, net bags and the like which are used for fruits, vegetables and other foodstuffs, trash, garbage and the like. However, the fastening devices heretofore employed possess numerous drawbacks and disadvantages. They are unreliable, often difficult and inconvenient to apply or remove, relatively expensive, and of little versatility and adaptability and otherwise leave much to be desired.

It is a principal object of the present invention to provide an improved fastening device.

Another object of the present invention is to provide an improved tie or binding device.

Still another object of the present invention is to provide an improved reusable tie strip having smooth side edges which is highly useful in releasably locking a bag or similar receptacle which is closed by gathering the neck thereof, in binding a stack of articles or a container.

A further object of the present invention is to provide a device of the above nature which is characterized by its reliability, simplicity, low cost, ruggedness, attractive appearance, ease and convenience of use and manufacture and great versatility and adaptability.

The above and other objects of the present invention will become apparent from a reading of the following description taken in conjunction with the accompanying drawing which illustrates a preferred embodiment thereof.

In a sense the present invention contemplates the provisions of an improved tie strip comprising an elongated, pliable resilient strip flexible about its longitudinal spaced openings formed therein along the medial axis and a flexible resilient tongue registering with each of the openings and projecting longitudinally from an end edge of the respective opening and being integrally formed with the strip.

In one preferred construction, the openings are of rectangular shape and are regularly, longitudinally spaced and a pair of tongues register with each opening and are of generally triangular shape with their bases coinciding with the opening end edges and their apices directed toward each other and longitudinally spaced. The strip is advantageously formed of a thermoplastic organic polymeric resin.

In another preferred construction, the tongues of the longitudinally spaced openings are generally hempherical in shape and with a slit or opening disposed between consecutive openings and along the longitudinal axis of the strip.

Another embodiment is in the form of an individual ready to use device with the longitudinally spaced openings being generally arrow-head shaped and facing towards an enlarged width one end of the strip, with the end edge of each opening having a tab extending therefrom into the opening and also facing said one end edge of the strip. The one end of the strip has an opening therein with a pair of tongues registering with the opening with their bases coinciding with the end edges of the opening and facing each other. The opening has curved side walls generally converging towards the edge of the said one end and the tongues or tabs in each opening are generally hemispherical in shape. The end opposite to said one end being tapered at both side edges to aid in passing through the opening in said one end. A slit or opening extends longitudinally along the center line of said opposite end.

A further embodiment of the individual tie has one tongue extending into the opening in the one end of the strip from the edge facing the edge of the one end. The sides of the opening extend generally parallel to the axis of the strip from opposite ends of the tongue edge and then diverging inwardly. The edge of the opening opposite the tongue edge is generally transverse to the axis of the strip. Further, the end edges of the longitudinally spaced openings in the strip closest to the enlarged end is rounded.

The improved tie strip is easy and convenient to apply and tighten and to loosen and remove, and in its tightened condition it is highly secure and is not likely to be accidentally released. The tie strip is inexpensive, of attractive appearance and of great versatility and adaptability and can be used to decoratively tie packages.

FIG. 1 is a fragmentary plan view of a tie strip embodying the present invention from which the individual tie strip devices are cut;

FIG. 2 is a perspective view of a tie strip device in a tying condition;

FIG. 3 is a sectional view taken along line 3—3 in FIG. 2;

FIG. 4 is an enlarged fragmentary detailed view of the intercoupled portion thereof.

FIG. 5 is a fragmentary plan view of another embodiment of the tie strip embodying the present invention;

FIG. 6 is a plan view of a different embodiment of the invention illustrating an individual tie strip;

FIG. 7 is a perspective view of a bag, shown in phantom, closed by a tie strip of this embodiment;

FIG. 8 is a fragmentary or sectional view taken along line 8—8 of FIG. 7;

FIG. 9 is a fragmentary reduced front elevational view of a plastic bag having a tie strip affixed thereto.

FIG. 10 is a plan view of another embodiment of the invention illustrating a tie strip.

FIG. 11 is a perspective view of a bag, shown in phantom, closed by a tie strip of this embodiment; and FIG. 12 is a fragmentary or sectional view taken along line 12—12 of FIG. 11.

Referring now to the drawings which illustrate the structural embodiments of the present invention, as seen best in FIGS. 1-8, one embodiment of the present invention is shown in FIGS. 1-4, the reference numeral 10 generally designates the tie strip stock from which the individual tie strips 11 are cut to the desired lengths depending on their ultimate applications. The strip stock is produced by any suitable method such as by continuous extrusion and cutting and is advantageously formed of a thermoplastic synthetic organic polymeric resin such as a polyolefin, for example, polyethylene or polypropylene, polyvinyl chloride or the like. Other resilient materials can be used, including metals.

As shown the longitudinal side borders or edges 12 of the stock 10 are smooth, continuous and advantageously may be thicker than the medial section of web 13, which constitutes a major portion of the strip. The strip 11 including the web 13 is resilient and flexible and is resiliently foldable about its longitudinal medial axis. The width of the stock or strip as well as the length of the cut strip 11 may be, as desired, depending on its end use, for example, it may have a width of ⅜ inch and a length of about 5 inches.

Medially formed in the web 13 are regularly longitudinally spaced openings 14 of roughly transversely extending butterfly configuration. More specifically each opening 14 may be considered to be of rectangular or square configuration with longitudinal side edges 16 and transverse end edges 15. Projecting inwardly from each of the opening end edges 15 is a pawl defining generally triangular tongue 17 of equilateral configuration. The tongues 17 are integrally formed with the web 13 and their bases are substantially coextensive and coincide with the opening end edges, and their spices 18 are rounded and medially located. The spices 18 of the pair of tongues 17 registering with each opening are longitudinally spaced by a necked space 19. The tongues 17 are resilient and are normally coplanar with the web 13.

The stock 10 is cut into the individual tie strips 11 of the desired length along cut lines 20. If desired, tie strips 11 can converge to form a pointed leading edge.

Considering now the operation of the improved tie strip 11, in application, the strip 11 is wrapped around the article to be tied, for example the necked portion of a closed bag, and the leader 21 is bent downwardly about its longitudinal medial azis and inserted into an opening 13 proximate the article being tied to form a closed loop 23. The loop 23 is tightened by pulling the leader 21 and the opposite end 22 in opposing directions. In the above relative orientation, the advance of the leading portion of the strip 11 through an opening 14 is permitted, since with the advance of the strip through the opening, the strip is longitudinally folded by the contracting opening 14 and the trailing tongues 17 in the successive openings 14 of the advancing portion of the strip 11 sequentially bend the trailing tongue 17 in the threaded opening 14 to allow the passage of the strip 11 therethrough as best seen in FIG. 4.

However, retraction or reverse movement of the leader portion through the opening is prevented, since upon such reverse movement, a leading tongue 17 in the leader portion moves into engagement with the top or outer face of the trailing tongue 17 in the threaded opening and bends outwardly to overlap the latter tongue and effect an interlocking relationship. If it is desired to loosen or open the loop 23, the inclination of the pierced portion of the strip 11 is reversed and is pulled in the direction of arrow B, as shown in FIG. 3, to open the loop 23. The relationship of the tongue 17 in the reverse movement of the leader portion when the opposite relative inclination is effected is similar to the relationship of the tongues with the advance movement of the leader portion at the initial tightening inclination in the direction of arrow A.

Referring now to FIG. 5, there is shown another embodiment of the present invention where the tie strip stock, illustrated by the reference numeral 30, may have the individual tie strips units easily removable from the strip by reason of notches 32 extending transversely inwardly from each of the longitudinal edges 34. The apex of each notch 32 lies adjacent an edge of an opening 36 to leave a thin piece of material so as to allow easy separation of the individual tie strip from the length of stock when pulled. By varying the longitudinal distance between notches 32, the length of the individual tie strips can be varied to suit specific needs. While notches 32 were shown, cuts or slits could be used.

Advantageously, openings 36 are generally rectangular in configuration with longitudinal side edges 38 and transverse end edges 40. Projecting inwardly from each of the end edges 40 is a pawl defining generally hemispherical tongue 42. The edges of tongue 42 facing each other in openings 36 are spaced apart a distance greater than the radius of each of the tongues 42. Disposed along the longitudinal axis of strip 30 between each consecutive opening 36 is a slit 44.

The individual tie strips broken or removed from strip 30 are used in a matter similar to the embodiment first described above as illustrated in FIGS. 2-4. The larger spaces between facing tongues 42 and the slits 44 allow strip 30 to be bent generally along the longitudinal axis of the strip 30 to allow easier insertion of the end of the tie strip through a selected opening 36 and to assume a smooth curved arch shape through selected openings 36. This bending along the longitudal axis allows firm holding of the noose in the tightened position and relatively easy separation when desirable. Advantageously, strip 30 is made of a uniform cross section. One example which has been found to be satisfactory is a ⅜ inch strip having a thickness of about 0.013 inch.

Another embodiment of the present invention is illustrated in FIGS. 6 through 8 which illustrates an individual tie strip 46, which comprises an elongated strap portion 48 and a tab head portion 50 integrally joined at one end and having an enlarged width. The longitudinal side borders or edges 52 of strap portion 48 are smooth and continuous. Medially formed in the strap portion 48 are regularly, longitudinally spaced openings 54 of roughly arrow-head configuration, pointing towards the enlarged head 50 at one end. The opposite end of strap portion 48, remote from end 50, is tapered inwardly and converges to preferably form a narrow leading tip 51, which presents the appearance of an elongated and blunted arrow-head.

Each opening 54 has longitudinal side edges 56 with end edges 58 converging inwardly from the ends of side edges 56 closest to head 50 to form an apex 60 generally along the longitudinal axis of strip 46. The end edges of opening 54 closest to strip end 51 are generally transverse, as indicated at 62. Projecting inwardly into opening 54 from each of end edge 62 is a pawl defining tongue 64. Tongues 64 are integrally formed and coplanar with the web of strap portion 48 and each has a generally truncated pyramid shape, with tapered side edges 66 and a transverse end edge 68. The base of each tongue 64 is substantially coextensive and coincides with the transverse edge 62.

Disposed generally coaxially along the longitudinal axis of tip 51 is a pair of elongated openings 70 and 72. While openings are illustrated, slits may also be used.

Enlarged tab head 50 is substantially wider than strip portion 48 with both of its side edges 74 tapering outwardly from the ends of side edges 52 of strap portion 48 and preferably is symetrical about the longitudinal center line of strip 46. Medially formed in head portion 50 adjacent end edge 75 is an opening 76 having curved side edges 78 converging toward end edge 75 and transverse end edges 80 and 82. Projecting inwardly into opening 76 from transverse edge 80 is tab or tongue 86 and projecting inwardly from end edge 82 is a pawl defining generally hemispherical tongue 88. Both tongues 86 and 88 are integrally formed with head 50 and their bases are substantially coextensive and coinside with their corresponding opening end edges 80 and 82 respectively. The radius of tab 86 is larger than the radius of tongue 88 since opening 76 is wider along edge 80. The facing edges of tongues 86 and 88 are spaced apart and normally coplaner with head 50. The width of opening 76 is smaller than the width of strap portion 48 so as to force strap portion 48 into a smooth arch shape configuration during its passage therethrough in a manner discussed in detail below.

The operation of the improved tie strip 46 is generally similar in operation and in concept as the embodiments discussed above. Strip 46 is wrapped around the article to be tied, such as the neck portion of a closed bag 92, as seen best in FIG. 7. The lead tip 51 is inserted into opening 76 in the head portion 50 so as to form a closed loop. Longitudinal elongated openings 70 and 72 in the lead tip 51 allow end 51 to be bent along its longitudinal axis to provide easy entry into opening 76. The tip 51 and tap head 50 are pulled in opposite directions to tighten strip 46 around bag 92. By nature of the construction of opening 76 and the spaced apart openings 54 along strap portion 48, the strap portion 48 arches in a generally smooth curve in passing through opening 76. Strap portion 48 advances through opening 76 by tongue 88 successively bending tongue 64 of openings 54 as it passes. In view of the arch curve of strap portion 48 in the opening 76, tongues 64 are fully exposed and extend beyond the surface of strap portion 48, so that retraction of strap portion 48 through opening 76 is prevented, because reverse movement produces an overlapping and interlocking relationship between tongue 88 and the prior successive tongue 64 to provide a firm grip and locking action as shown in FIGS. 7 and 8. However, to remove and loosen the loop, tap head 50 merely is pulled toward end 51 as viewed in FIG. 7 whereby tab 88 is lifted over tabs 64, allowing separation of a loop.

Opening 76 is wider at the edge 80, which is closest to end 51 so as to urge the strap portion 48 to arch properly when advancing through opening 76 in the manner discussed above. Similarly, tongue 88 provides a strong lock and prevents reverse arching of strap portion 48 in opening 76. Since sidewall 78 is sloped downwardly and outwardly towards tip 51, strap portion 48 arches in the proper manner for the cooperative interaction between the corresponding tongues 64 and 88, wherein the side edges 52 of strap portion 48 are urged toward the intersection of opening side edges 78 and transverse end edge 80. Since the openings 54 along strap portion 48 have a configuration to allow easy bending along the center line, proper tongue interaction is assured. Further, the arching along the central line during passage through opening 76 straightens out any bent tongue 86 during prior operations.

Disposed between opening 76 in head 50 and the closest opening 54 along strap portion 48 are a pair of longitudinal directed spaced apart openings 90, which reduce the stiffness of head 50 to allow easier handling during use and also allows strip 46 to be mounted on wires, strands or the like ready for use. While openings 90 are shown, they could also be slits and similarly while side edges 78 are illustrated curved, they also may be straight as long as slanted in the same general direction as shown. Also, while openings 54 are shown in generally arrow-head construction, other configurations could be used so long as the tab construction is generally as shown and easier bending along the longitudinal central line is provided, such as by slits as illustrated in the embodiment of FIG. 5, or a series of openings.

FIG. 9 illustrates an individual tie strip 46 which may be used with flexible plastic bag structure, such as polyethylene bags commonly used. The tie strip 46 is permanently attached adjacent one side edge 94 of bag 95 spaced from open, upper edge 96. Advantageously tie strip 46 is heat sealed to the walls of plastic bag 95 at a point 97 between head opening 76 and strap portion opening 54. By attaching tie strip 46 adjacent a side edge of the bag, there is little restriction to the full opening of the bag. The tie strip 46 is in position ready to be used. If necessary, the head end 50 could extend beyond the side edge to reduce to a minimum the interference to the opening of the bag. Also, the tie strip 46 could be stapled, welded, glued or affixed in other well known means.

A further embodiment of the present invention is illustrated in FIGS. 10 through 12 which illustrate another individual tie strip 146 generally similar to tie strip 46 discussed above. Tie strip 146 comprises an elongated strap portion 148 and a tab head portion 150 integrally joined at one end and having an enlarged width. The longitudinal side borders or edges 152 of strap portion 148 are smooth and continuous. Medially formed in the strap portion 148 are regularly, longitudinally spaced openings 154 of roughly arrowhead configuration, pointing towards the enlarged head 150 at one end. The opposite end of strap portion 148, remote from end 150, is tapered inwardly and converges to preferably form a narrow leading tip 151, which presents the appearance of an elongated and blunted arrowhead. Advantageously, both ends are embossed or roughened, as at 153, to aid gripping.

Each opening 154 has longitudinal side edges 156 with end edges 158 converging inwardly from the ends of side edges 156 closest to head 150, and connected to a generally rounded end 160. The end edges of opening 154 closest to strip end 51 is generally transverse, as indicated at 162. Projecting inwardly into opening 154 from each of end edge 162 is a pawl defining tongue 164 generally similar in structure and purpose as tongue 64 discussed with the last mentioned embodiment and corresponding parts bear similar numerals with the addition of 100.

Disposed generaly coaxially along the longitudinal axis of tip 51 is a generally tear shaped opening 170 with the larger width of opening furthest from tip 151.

Enlarged tap head 150 is substantially similar to tab head 50 of the prior embodiment. Medially formed in head portion 150 adjacent end edge 175 is an opening 176 of generally truncated arrow head configuration facing toward end edge 175 with transverse end edges 180 and 182. Projecting inwardly into opening 176 from transverse edge 180 is tab or tongue 86, which is normally coplanar with head 50, integrally formed with head 150 and its base is substantially coextensive and coincides with its corresponding opening end edge 180. Extending longitudinally from opposite ends of edge 180 is side edges 178, which extend beyond tab 186, connecting the ends of sides 178 with end edge 182 are converging side edges 179. The width of opening 176, especially between tab 186 and edge 182, is smaller than the width of strap portion 148 so as to force the strap into a channel shape configuration during its passage therethrough in a manner discussed in detail below. As illustrated, the height of opening 176 is less than one half the width of strap portion 148.

The operation of the improved tie strip 146 is generally similar in operation and in concept as the embodiments discussed above. Strip 146 is wrapped around the article to be tied, such as the neck portion of a closed bag 192, as seen best in FIG. 11. The lead tip 151 is inserted into opening 176 in the head portion 150 so as to form a closed loop. Longitudinal elongated opening 170 in the lead tip 151 allows end 151 to be bent along its longitudinal axis to provide easy entry into opening 176. The tip 151 and tab head 150 are pulled in opposite directions to tighten strip 146 around bag 192. By nature of the construction of opening 176 and the spaced apart openings 154 along strap portion 148, the strap portion 148 arches in a generally channel shape in passing through opening 176 with tabs 164 extending longitudinally. Strap portion 148 advances through opening 176 by edge 182 successively bending tongue 164 of openings 154 as it passes. In view of the channel shape configuration of strap portion 148 in the opening 176, tongues 164 are fully exposed and extend beyond the surface of strap portion 148, so that retraction of strap portion 148 through opening 176 is prevented, because reverse movement produces an overlapping and interlocking relationship between edge 182 and the prior successive tongue 164 to provide a firm, positive grip and locking action as shown in FIGS. 11 and 12. The loop may be removed and loosened in a manner similar to the last discussed embodiment.

Opening 176 is wider at the edge 180, which is closest to end 151 so as to urge the strap portion 148 to arch properly when advancing through opening 176 in the manner discussed above. Since sidewalls 179 are sloped downwardly and outwardly from end 182 towards tip 151, strap portion 148 arches in the proper manner for the cooperative interaction between tongue 164 and edge 182, wherein the side edges 152 of strap portion 148 are urged toward the intersection of opening side edges 178 and transverse end edge 180.

Also, while openings 154 are shown in generally arrowhead construction with a curved end opposite tab 164, other configurations could be used so long as the tab construction is generally as shown.

An individual tie strip 146 may be used with flexible plastic bag structure in a manner similar to that shown in FIG. 9.

A number of modifications to the invention has been described herein, but in addition to these, a number of other modifications and changes will be readily apparent to those skilled in the art. Consequently, it is intended that the present disclosure of the structures be illustrated only and not limited in detail. Thus, the tie strips disclosed may be uniform in thickness or have thicker side edges or center portions if desired. For rough usage, a reinforcing wire can be added along one or both of the side edges in a manner well known to the trade. Further, while the tongues have been illustrated generally as triangular, semi-circular or truncated pyramids, other configurations may be utilized. Also, the tap heads 50 and 150 can be extended and made longer to have a message thereon.

I claim:

1. An individual tie strip comprising an elongated pliable resilient strip, said strip being flexible about its longitudinal medial axis and having longitudinally spaced generally similar openings formed therein, at least one flexible resilient tongue registering with each of said openings and projecting generally longitudinally from an end edge of the respective opening and being integrally formed with said strip, wherein the strip is flexed along its longitudinal axis and one end of the strip is passed through one opening to form a loop, the tongues of the openings along the strip advancing through said one opening sequentially being bent by the edge of said one opening through which the loop is advancing, and that said one opening resists expansion of the loop by interlocking with the tongue of the cooperating other opening, said strip including a strap portion and a tab head portion integrally mounted at one end and being wider than said strap portion.

2. The tie strip of claim 1 wherein the end of said strip opposite said head end having the sides tapering inwardly toward its free end and having at least one longitudinally extending opening along the axis of said strip.

3. The tie strip of claim 2 wherein said opening along the axis is generally tear shape in configuration.

4. The tie strip of claim 1 wherein each of said tongues of said strap portion opening includes side edges converging longitudinally towards its respective free end.

5. The tie strip of claim 1 wherein said openings along said strap portion being of generally arrowhead configuration having its end edge remote from said head portion being generally transverse to the axis of said strip and including a resilient tongue registering with each of said openings, each of said tongues being generally a truncated pyramid with its base coinciding with said opening transverse end edge, each of said opening end edges opposite to said transverse edge converging longitudinally towards said head portion.

6. In combination, a flexible plastic bag having an open-mouth, and edges along said open-mouth, sides and closed end, and fixedly secured to the outside wall of said bag adjacent one edge and the open-mouth, a device as defined in claim 2.

7. A strip of claim 1 wherein said head end having adjacent its end edge an opening formed therein having opposite end edges, said one end being opposite to said head portion and passing through said head opening.

8. The tie strip of claim 7 wherein the head opening has side edges adjacent the end edge of said opening facing the strap portion, said side edges being angled to the longitudinal central line of said strip and converge towards the end edge of said head.

9. The tie strip of claim 8 wherein the head opening has side edges longitudinally extending from opposite ends of the end edge of the opening closest to the strap portion to corresponding angled side edges extending from the opposite end edge of the opening.

10. The tie strip of claim 9 wherein the height of the head opening is less than one half of the width of the strap portion.

11. The tie strip of claim 7 wherein the end edge of the head opening facing the head edge of said strip has a flexible resilient tongue registering with said opening and projecting generally longitudinally therefrom and being integrally formed with said head.

* * * * *